US012724811B2

(12) United States Patent
Kashyapi et al.

(10) Patent No.: US 12,724,811 B2
(45) Date of Patent: Sep. 1, 2026

(54) MACHINE LEARNING-BASED PROCESSING OF LOG ERROR CODES

(71) Applicant: Dell Products L.P., Round Rock, TX (US)

(72) Inventors: Sumanta Kashyapi, Redmond, WA (US); Ramesh Doddaiah, Westborough, MA (US); David C. Sydow, Merrimack, NH (US); Shreyans Jasoriya, New Haven, CT (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/049,119

(22) Filed: Feb. 10, 2025

(65) Prior Publication Data

US 2026/0236513 A1 Aug. 13, 2026

(51) Int. Cl.

*G06F 16/338* (2019.01)
*G06F 11/07* (2006.01)
*G06F 16/3329* (2025.01)
*G06F 40/289* (2020.01)

(52) U.S. Cl.

CPC ........ *G06F 16/338* (2019.01); *G06F 11/0766* (2013.01); *G06F 16/3329* (2019.01); *G06F 40/289* (2020.01)

(58) Field of Classification Search

CPC ..................................................... G06F 16/338
See application file for complete search history.

(56) References Cited

U.S. PATENT DOCUMENTS

2018/0204111 A1* 7/2018 Zadeh ................. G06F 18/2413
2023/0065188 A1* 3/2023 Piagentini ........... G06F 11/0769
2024/0169007 A1* 5/2024 Gloege ............... G06F 16/9538
2024/0345811 A1* 10/2024 Schneuwly ............... G06F 8/36
2024/0346021 A1* 10/2024 Xuan ................ G06F 16/24522

(Continued)

OTHER PUBLICATIONS

C. Zhou et al., “A Comprehensive Survey on Pretrained Foundation Models: A History from BERT to ChatGPT,” arXiv:2302.09419v3v2 [cs.AI], May 2023, 99 pages.

(Continued)

*Primary Examiner* — Van H Oberly
(74) *Attorney, Agent, or Firm* — Ryan, Mason & Lewis, LLP

(57) ABSTRACT

An apparatus comprises at least one processing device configured to obtain a query comprising search text identifying one or more error codes in one or more system logs associated with information technology assets operating in an information technology infrastructure. The at least one processing device is also configured to select, as context for the query, a subset of a plurality of document chunks each comprising a portion of content of one or more documents containing information associated with the error codes. The at least one processing device is further configured to generate and apply a prompt for input to a machine learning system comprising the selected subset of the document chunks to generate an output, and to provide an answer to the query based on the output of the machine learning system, the answer comprising a natural language description of at least one of the error codes.

20 Claims, 10 Drawing Sheets

(56) References Cited

U.S. PATENT DOCUMENTS

| | | | | |
|---|---|---|---|---|
| 2024/0411981 | A1 * | 12/2024 | Braddy | G06F 8/30 |
| 2025/0147832 | A1 * | 5/2025 | Agrawal | G06F 11/0769 |

OTHER PUBLICATIONS

S. Minaee et al., "Large Language Models: A Survey," arXiv:2402.06196v2 [cs.CL], Feb. 2024, 43 pages.

"Google Code Archive—Long-term storage for Google Code Project Hosting" "word2vec" , https://code.google.com/archive/p/word2vec/, Jan. 23, 2025, 7 pages.

"LangChain" https://python.langchain.com/docs/introduction, Jan. 23, 2025, 6 pages.

Wikipedia, "Okapi BM25" https://en.wikipedia.org/wiki/Okapi_BM25, Jan. 23, 2025, 4 pages.

* cited by examiner

300

| ERROR CODE | DATE | TIMESTAMP | DESCRIPTION |
|---|---|---|---|
| EC1 | DATE1 | TIME1 | LOW RECEIVE POWER DETECTED FOR SMALL FORM-FACTOR PLUGGABLE (SFP) MODULE |
| EC2 | DATE1 | TIME2 | TOO MANY REQUESTS BY THREAD IN 1 MILLISECOND (MS) |
| EC3 | DATE1 | TIME3 | TOO MANY REQUESTS IN 1MS TO ONE STORAGE DIRECTOR |
| EC4 | DATE1 | TIME4 | TASK ABORTED |
| EC5 | DATE1 | TIME5 | <NO DESCRIPTION> |
| EC6 | DATE1 | TIME6 | SCAN ENGINE: MESSAGE CONTEXT DOESN'T MATCH |
| EC6 | DATE1 | TIME7 | SCAN ENGINE: MESSAGE CONTEXT DOESN'T MATCH |
| EC5 | DATE1 | TIME8 | <NO DESCRIPTION> |
| EC7 | DATE1 | TIME9 | EVENT: END OF EXCEPTION |
| EC8 | DATE1 | TIME10 | SYMBOLIC FILE SYSTEM (SFS) INITIALIZATION (INIT) COMPLETED NORMALLY |
| EC9 | DATE1 | TIME11 | SFS INIT MAIN STARTED |
| EC10 | DATE1 | TIME12 | SFS RESET WAS ISSUED |
| EC11 | DATE1 | TIME13 | SFS INIT STARTED |

FIG. 3

| ERROR CODE | DESCRIPTION |
|---|---|
| CD22.18 | HOST READ OR WRITE IS ABORTED... |
| FC38.63 | ... |
| ... | ... |

800

| EMULATION TYPE | ERROR CODE | LATEST TIMESTAMP | NATURAL LANGUAGE SUMMARY DESCRIPTION |
|---|---|---|---|
| FRONT-END EMULATION | EC1 | TIMESTAMP1 | FIBER CHANNEL FRAMES ARE GETTING DROPPED ON THE LINK LEADING TO TIMEOUT ERRORS. |
| FRONT-END EMULATION | EC2 | TIMESTAMP2 | IO IS GETTING ABORTED REMOTELY FROM THE HOST LEADING TO THIS ERROR. |
| FRONT-END EMULATION | EC3 | TIMESTAMP3 | IO IS HUNG FOR MORE THAN 180 SECONDS, LEADING TO LOST IO. |
| FRONT-END EMULATION | EC4 | TIMESTAMP4 | THE HOST NEVER COMPLETED WRITE, CLEANUP IS HAPPENING ON THE IO METADATA LIKE TRACK AND SLOT. SECTOR SIGNATURE AND CLEANUP ARE SUCCESSFUL. |

FIG. 8

MACHINE LEARNING-BASED PROCESSING OF LOG ERROR CODES

BACKGROUND

As the value and use of information continues to increase, individuals and businesses seek additional ways to process and store information. Information processing systems may be used to process, compile, store and communicate various types of information, including through the use of artificial intelligence (AI) and machine learning (ML). Large language models (LLMs) are a type of AI system that uses ML algorithms to process vast amounts of natural language text data. LLMs may be used to perform various natural language processing (NLP) tasks, including text classification, text summarization, text generation, named entity recognition, text sentiment analysis, and question answering.

SUMMARY

Illustrative embodiments of the present disclosure provide techniques for machine learning-based processing of log error codes.

In one embodiment, an apparatus comprises at least one processing device comprising a processor coupled to a memory. The at least one processing device is configured to obtain a query, the query comprising search text identifying one or more error codes in one or more system logs associated with one or more information technology assets operating in an information technology infrastructure. The at least one processing device is also configured to select, as context for the query, a subset of a plurality of document chunks, each of the plurality of document chunks comprising a portion of content of one or more documents containing information associated with the one or more error codes. The at least one processing device is further configured to generate, based at least in part on the query, a prompt for input to a machine learning system, the prompt comprising the selected subset of the plurality of document chunks, to apply the prompt to the machine learning system to generate an output, and to provide an answer to the query based at least in part on the output of the machine learning system, the answer comprising a natural language description of at least one of the one or more error codes.

These and other illustrative embodiments include, without limitation, methods, apparatus, networks, systems and processor-readable storage media.

BRIEF DESCRIPTION OF THE DRAWINGS

FIG. 3 shows an example of system logs including error codes in an illustrative embodiment.

FIG. 8 shows an example mapping of error codes in system logs to natural language summary descriptions thereof in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
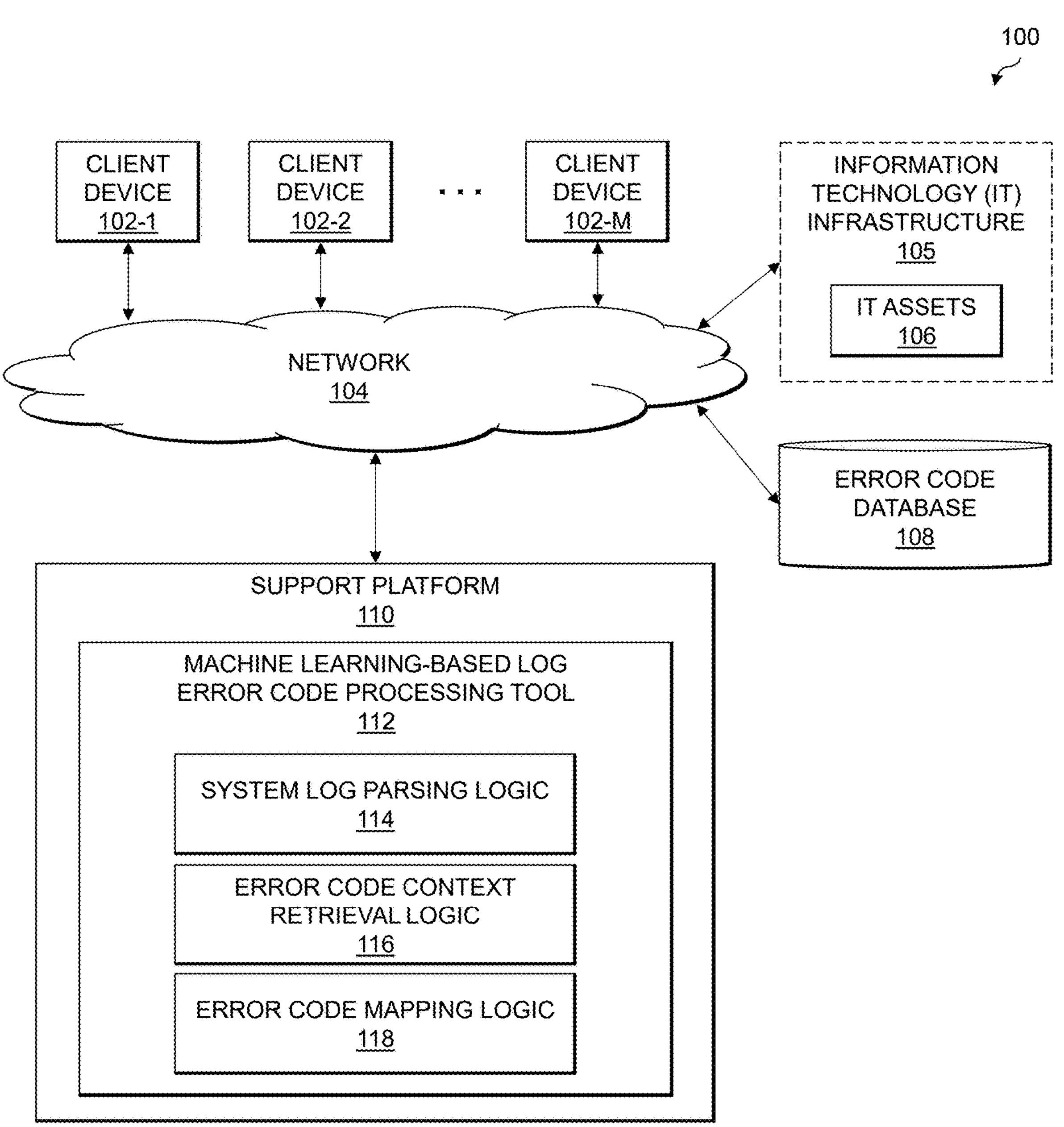
FIG. 1 is a block diagram of an information processing system configured for machine learning-based processing of log error codes in an illustrative embodiment.

FIG. 1 shows an information processing system 100 configured in accordance with an illustrative embodiment. The information processing system 100 is assumed to be built on at least one processing platform and provides functionality for machine learning-based processing of log error codes. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, an error code database 108, and a support platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the support platform 110 is used for an enterprise system. For example, an enterprise may subscribe to or otherwise utilize the support platform 110 for performing troubleshooting and remediation of issues (e.g., encountered on the IT assets 106 of the IT infrastructure 105, for an enterprise, organization or other entity that operates or is responsible for managing or providing support services for the IT infrastructure 105). As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The error code database 108 is configured to store and record various information that is utilized by the support platform 110. Such information may include, for example, artificial intelligence (AI) and machine learning (ML) models used for troubleshooting and remediation of issues, including AI/ML models such as Large Language Models (LLMs), Retrieval-Augmented Generation (RAG) processing, etc., mappings between error codes and natural language descriptions thereof (e.g., summaries, definitions, etc.), system logs including error codes, etc. The error code database 108 may be implemented utilizing one or more storage systems. The term "storage system" as used herein is intended to be broadly construed. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 110, as well as to support communication between the support platform 110 and other related systems and devices not explicitly shown.

The support platform 110 may be provided as a cloud service that is accessible by one or more of the client devices 102 to allow users thereof to perform issue detection and remediation for different users of an enterprise, organization or other entity. In some embodiments, the client devices 102 are utilized by members of the same enterprise, organization or other entity that operates the support platform 110. In other embodiments, the client devices 102 are utilized by members of one or more enterprises, organizations or other entities different than the enterprise, organization or other entity that operates the support platform 110 (e.g., a first enterprise provides support functionality for multiple different customers, businesses, etc.). Various other examples are possible.

In some embodiments, the client devices 102 and/or the IT assets 106 of the IT infrastructure 105 may implement host agents that are configured for automated transmission of information with the error code database 108 and the support platform 110 regarding user prompts for system log analysis, including determining the "meaning" of error codes in the system logs (e.g., a natural language description, summary or definition of what the error codes represent). It should be noted that a "host agent" as this term is generally used herein may comprise an automated entity, such as a software entity running on a processing device. Accordingly, a host agent need not be a human entity.

The support platform 110 in the FIG. 1 embodiment is assumed to be implemented using at least one processing device. Each such processing device generally comprises at least one processor and an associated memory, and implements one or more functional modules or logic for controlling certain features of the support platform 110. In the FIG. 1 embodiment, the support platform 110 implements a machine learning-based log error code processing tool 112. The machine learning-based log error code processing tool 112 comprises system log parsing logic 114, error code context retrieval logic 116, and error code mapping logic 118. The system log parsing logic 114 is configured to obtain a query that comprises search text identifying one or more error codes in one or more system logs associated with one or more of the IT assets 106 operating in the IT infrastructure 105. The error code context retrieval logic 116 is configured to select, as context for the query, a subset of a plurality of document chunks, each of the plurality of document chunks comprising a portion of content of one or more documents containing information associated with the one or more error codes. The error code mapping logic 118 is configured to generate, based at least in part on the query, a prompt for input to a machine learning system (e.g., an LLM), the prompt comprising the selected subset of the plurality of document chunks. The error code mapping logic 118 is also configured to apply the prompt to the machine learning system to generate an output, and to provide an answer to the query based at least in part on the output of the machine learning system, the answer comprising a natural language description of at least one of the one or more error codes.

At least portions of the machine learning-based log error code processing tool 112, the system log parsing logic 114, the error code context retrieval logic 116 and the error code mapping logic 118 may be implemented at least in part in the form of software that is stored in memory and executed by a processor.

It is to be appreciated that the particular arrangement of the client devices 102, the IT infrastructure 105, the error code database 108 and the support platform 110 illustrated in the FIG. 1 embodiment is presented by way of example only, and alternative arrangements can be used in other embodiments. As discussed above, for example, the support platform 110 (or portions of components thereof, such as one or more of the machine learning-based log error code processing tool 112, the system log parsing logic 114, the error code context retrieval logic 116 and the error code mapping logic 118) may in some embodiments be implemented internal to the IT infrastructure 105.

The support platform 110 and other portions of the information processing system 100, as will be described in further detail below, may be part of cloud infrastructure.

The support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the IT assets 106, the error code database 108 and the support platform 110 or components thereof (e.g., the machine learning-based log error code processing tool 112, the system log parsing logic 114, the error code context retrieval logic 116 and the error code mapping logic 118) may be implemented on respective distinct processing platforms, although numerous other arrangements are possible. For example, in some embodiments at least portions of the support platform 110 and one or more of the client devices 102, the IT infrastructure 105, the IT assets 106 and/or the error code database 108 are implemented on the same processing platform. A given client device (e.g., 102-1) can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the error code database 108 and the support platform 110, or portions or components thereof, to reside in different data centers. Numerous other distributed implementations are possible. The support platform 110 can also be implemented in a distributed manner across multiple data centers.

Additional examples of processing platforms utilized to implement the support platform 110 and other components of the information processing system 100 in illustrative embodiments will be described in more detail below in conjunction with FIGS. 9 and 10.

It is to be understood that the particular set of elements shown in FIG. 1 for machine learning-based processing of log error codes is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for machine learning-based processing of log error codes will now be described in more detail with reference to the flow diagram of FIG. 2. It is to be understood that this particular process is only an example, and that additional or alternative processes for machine learning-based processing of log error codes may be used in other embodiments.

In this embodiment, the process includes steps 200 through 208. These steps are assumed to be performed by the support platform 110 utilizing the machine learning-based log error code processing tool 112, the system log parsing logic 114, the error code context retrieval logic 116 and the error code mapping logic 118. The process begins with step 200, obtaining a query comprising search text identifying one or more error codes in one or more system logs associated with one or more IT assets operating in an IT infrastructure.

In step 202, a subset of a plurality of document chunks are selected as context for the query, each of the plurality of document chunks comprising a portion of content of one or more documents containing information associated with the one or more error codes. The one or more documents may comprise: source code of one or more applications running on the one or more IT assets that produced the one or more system logs; one or more knowledge base articles containing one or more mentions of at least one of the one or more error codes; one or more support tickets for one or more issues encountered on the one or more IT assets, the support tickets containing one or more mentions of at least one of the one or more error codes; and one or more support communications associated with one or more issues encountered on the one or more IT assets, the one or more support communications containing one or more mentions of at least one of the one or more error codes.

Step 202 may include utilizing a matching function to select ones of the plurality of document chunks as candidate document chunks that are relevant to at least one of the one or more error codes, the matching function utilizing an inverted index of the plurality of document chunks. Step 202 may further include utilizing a ranking function which ranks the candidate document chunks based at least in part on relevancy to at least one of the one or more error codes, and selecting a designated number of highest-ranking ones of the candidate document chunks as the subset of the plurality of document chunks.

In some embodiments, step 202 is based at least in part on a ranking of the plurality of document chunks generated utilizing at least one machine learning model (e.g., a Bidirectional Encoder Representations from Transformers (BERT) language model). Step 202 may be based at least in part on a ranking of the plurality of document chunks determined utilizing a parametric function configured to measure a likelihood of content of a document chunk providing an error code definition statement. The parametric function may be trained utilizing labeled examples of definition-style text spans in a document corpus.

Figure 2:
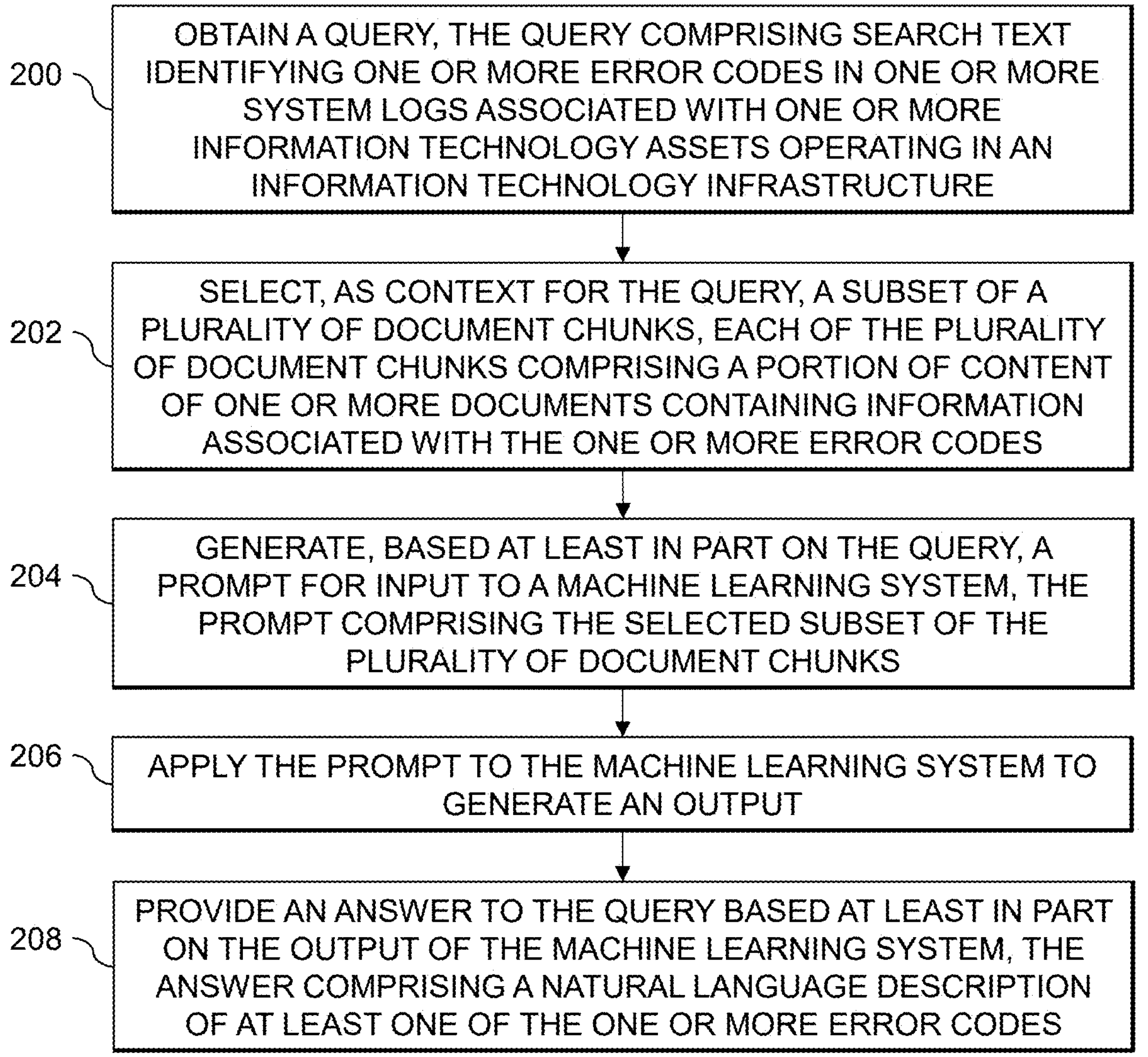
FIG. 2 is a flow diagram of an exemplary process for machine learning-based processing of log error codes in an illustrative embodiment.

The FIG. 2 process continues with step 204, generating a prompt for input to a machine learning system based at least in part on the query, the prompt comprising the selected subset of the plurality of document chunks. In step 206, the prompt is applied to the machine learning system to generate an output. An answer to the query is provided in step 208 based at least in part on the output of the machine learning system, the answer comprising a natural language description of at least one of the one or more error codes. The machine learning system may comprise an LLM utilizing Retrieval-Augmented Generation (RAG) processing with the selected subset of the plurality of document chunks.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, multiple instances of the process can be performed in parallel with one another, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Storage arrays and other types of IT assets may include hardware and software components or features. To manage issues which are encountered during operation, storage arrays and other IT assets may generate system logs, where the system logs include error codes (also referred to as system codes) in a time-ordered sequence. The time-ordered sequence of error codes offers developers, testers, sustenance engineers and other users insight into the causes of events. Error codes, however, often lack detailed natural language descriptions, making it difficult to fully understand the context of the error codes. FIG. 3 shows a table 300 including an example of a time-ordered sequence of error codes and their associated date, timestamp and description. As can be seen from the table 300, some error codes (e.g., EC5) have no description, while others have only basic details (e.g., EC4). Developers, engineers and other users (especially those from other teams or new users which do not necessarily have a large amount of domain expertise for the particular IT assets being analyzed) may struggle to quickly resolve issues due to insufficient or difficult to comprehend information in the system logs (e.g., including error codes that do not include any description, error codes that have only basic details, error codes that utilize non-standard technical jargon, etc.). Delays in resolving issues can be costly, as valuable resources are tied up. Detailed descriptions for error codes (e.g., natural language descriptions) could help quality engineers (QEs) or end-users address simple configuration issues independently (e.g., without developer or subject matter expert (SME) intervention). The descriptions for error codes, if present at all, are typically written by engineers or other users with a high level of domain knowledge, and typically lack depth from the perspective of less-sophisticated or knowledgeable users, such as customers, sustenance or test engineers, etc.

Illustrative embodiments provide technical solutions which leverage machine learning to analyze various data sources for error codes to extract summaries and provide concise natural language descriptions of the error codes (e.g., including necessary in-lines and counters) thereby enhancing issue troubleshooting and remediation. Some embodiments utilize an LLM configured with RAG functionality to determine "context" for prompts that are input to the LLM (e.g., queries seeking natural language descriptions of error codes), where the context includes relevant portions of the data sources that enhance the ability of the LLM to summarize error codes accurately, improving troubleshooting efficiency and reducing downtime.

An organization or other entity which manages an IT infrastructure including IT assets that produce system logs with error codes will typically utilize project management and/or bug tracking software (e.g., Jira, Bugzilla, etc.), as well as service requests, knowledge base (KB) articles, emails or other communications between testers (e.g., customers) and developers, source code and other data sources that include information about error codes. Such data sources in some embodiments are leveraged to determine information about error codes. For example, a database of email exchanges, threads or other communications may be used to extract summaries of developer analysis for different error codes, which are used by a machine learning model (e.g., an LLM configured with RAG functionality) to generate concise natural language summary descriptions for the different error codes.

The technical solutions described herein implement a hybrid retrieval engine that extracts relevant information surrounding an error code from various data sources to be used as the context while eliciting a natural language summary of the error code from an LLM. In some embodiments, the following data sources are used: (1) emails, threads or other communications related to issues, where such communications include conversations around issues where the error code in question played a significant role; (2) KB articles which contain various aspects related to the error code, such as the relevant product or IT asset type, known workarounds or diagnoses related to the error code, etc.; (3) Jira or other support tickets, which include service request documentation capturing crucial information regarding error codes including how the error codes are interpreted by experts in the field; and (4) source code, where it is software engineering best practice to provide comments and descriptions around a block of code for readability, and where such comments and descriptions may be present around code blocks where error codes are implemented or referred to.

Figure 4:
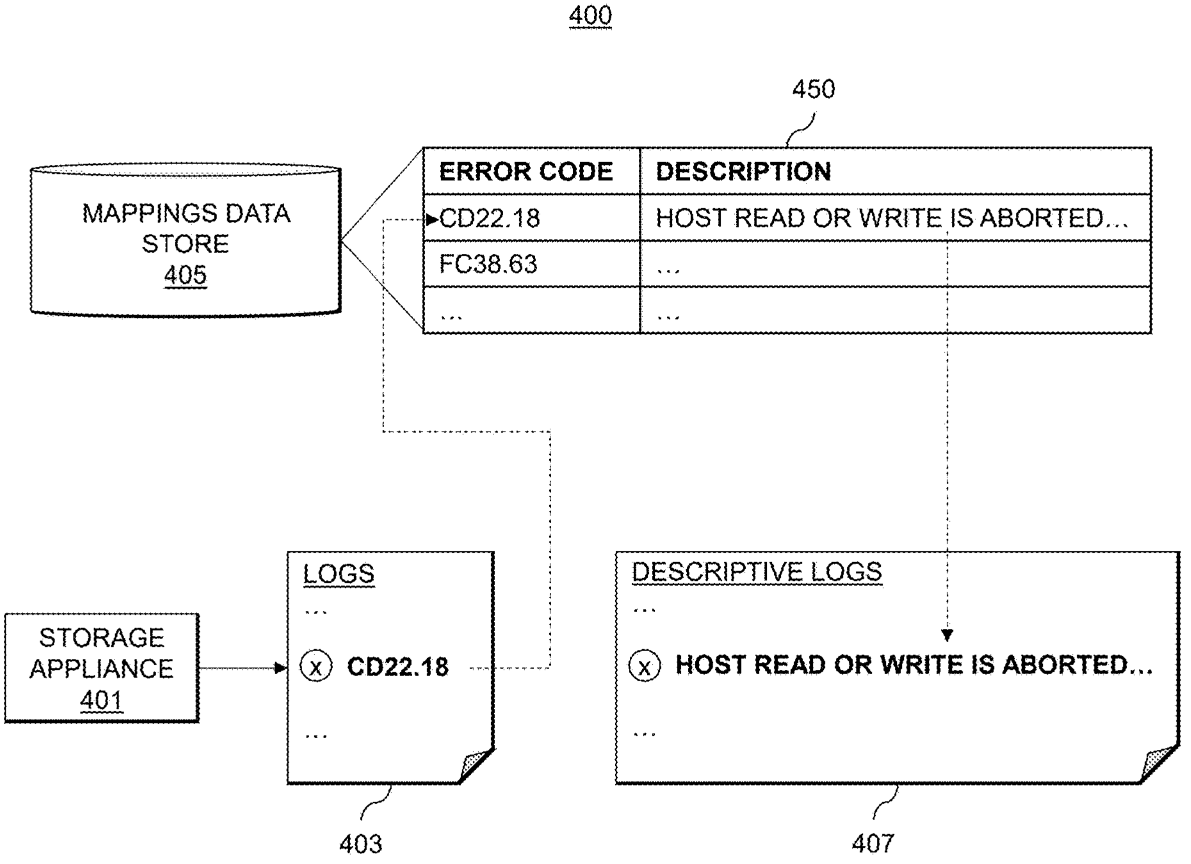
FIG. 4 shows a system flow for generating descriptive logs utilizing mappings between error codes and their associated natural language descriptions in an illustrative embodiment.

FIG. 4 shows a system flow 400 for building a lookup table or other data structure that is referred to during a log parsing process to replace cryptic error codes with descriptive texts (e.g., natural language descriptions), enabling users to gain more actionable insights from the logs. In the system flow 400, a storage appliance 401 (e.g., an example of an IT asset) produces a set of logs 403, including an error code (e.g., CD22.18). A mappings data store 405 is generated, which maps between error codes and natural language descriptions. This is illustrated as the table data structure 450, where error codes are associated with descriptions including natural language text. Using the mappings data store 405, descriptive logs 407 are generated from the logs 403, where the error codes are replaced with natural language text descriptions (e.g., the error code CD22.18 is replaced with "host read or write is aborted . . . ").

Figure 5:
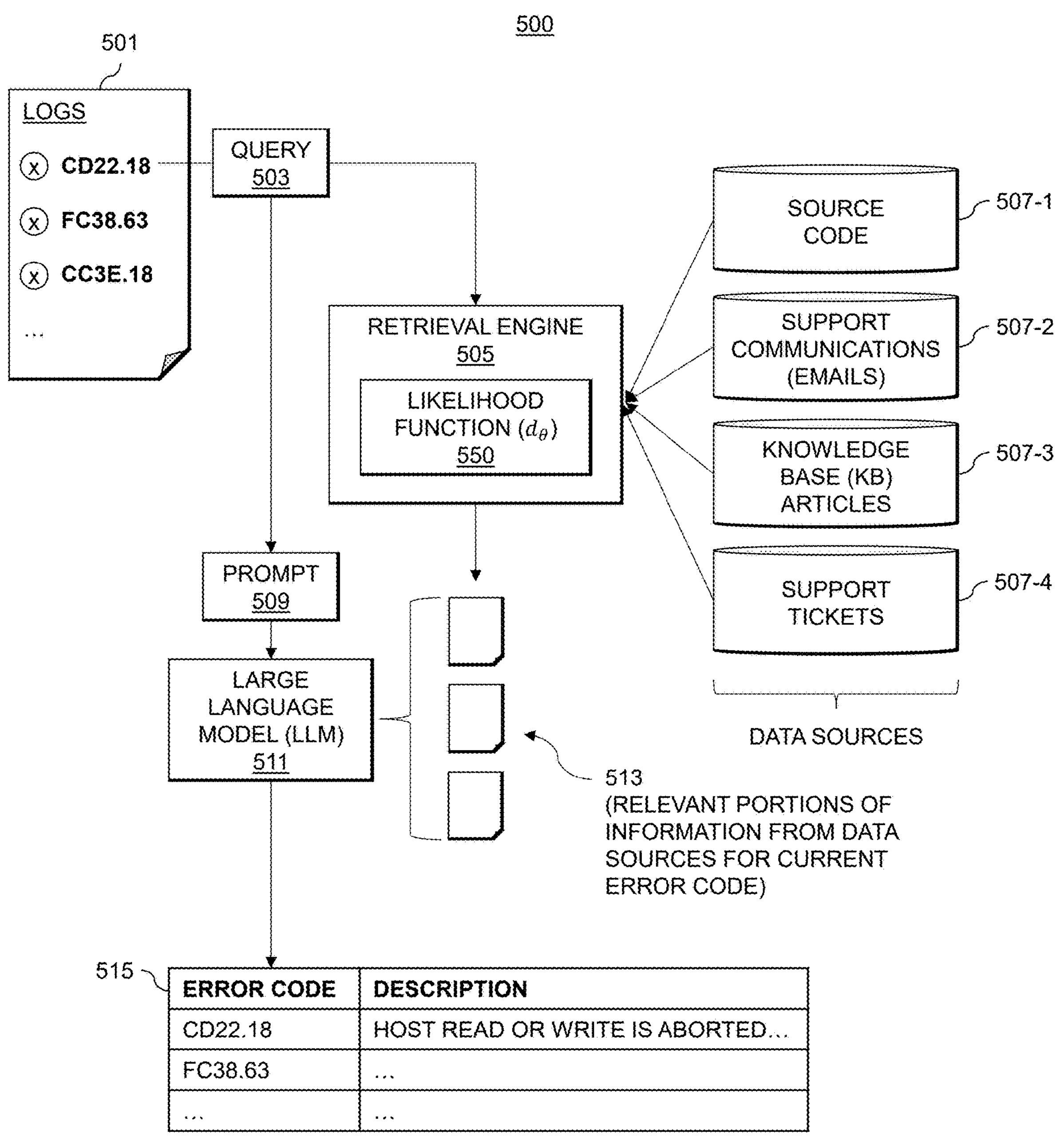
FIG. 5 shows a system flow for implementing a retrieval engine configured for determining natural language descriptions of error codes in an illustrative embodiment.

FIG. 5 shows a system flow 500 for implementing a retrieval engine 505 that is configured to retrieve "context" (e.g., to implement RAG functionality) for a query 503 that is generated to determine a description for one or more error codes in one or more system logs 501 (e.g., generated by or associated with operation of one or more IT assets in an IT infrastructure). The retrieval engine 505 takes as input information from various data sources, including source code 507-1, support communications 507-2 (e.g., email exchanges, threads or other communications), KB articles 507-3 and support tickets 507-4. The retrieval engine 505 comprises a likelihood function, $d_\theta$, with trainable parameters that is configured to determine relevant portions 513 of the information in the data sources 507-1 through 507-4 for the current error code being analyzed. Such relevant portions 513 are provided to an LLM 511 as "context" for a prompt 509 that is generated based on the query 503, allowing the LLM 511 to produce the mapping data structure 515 providing mapping between error codes and their descriptions.

Figure 6:
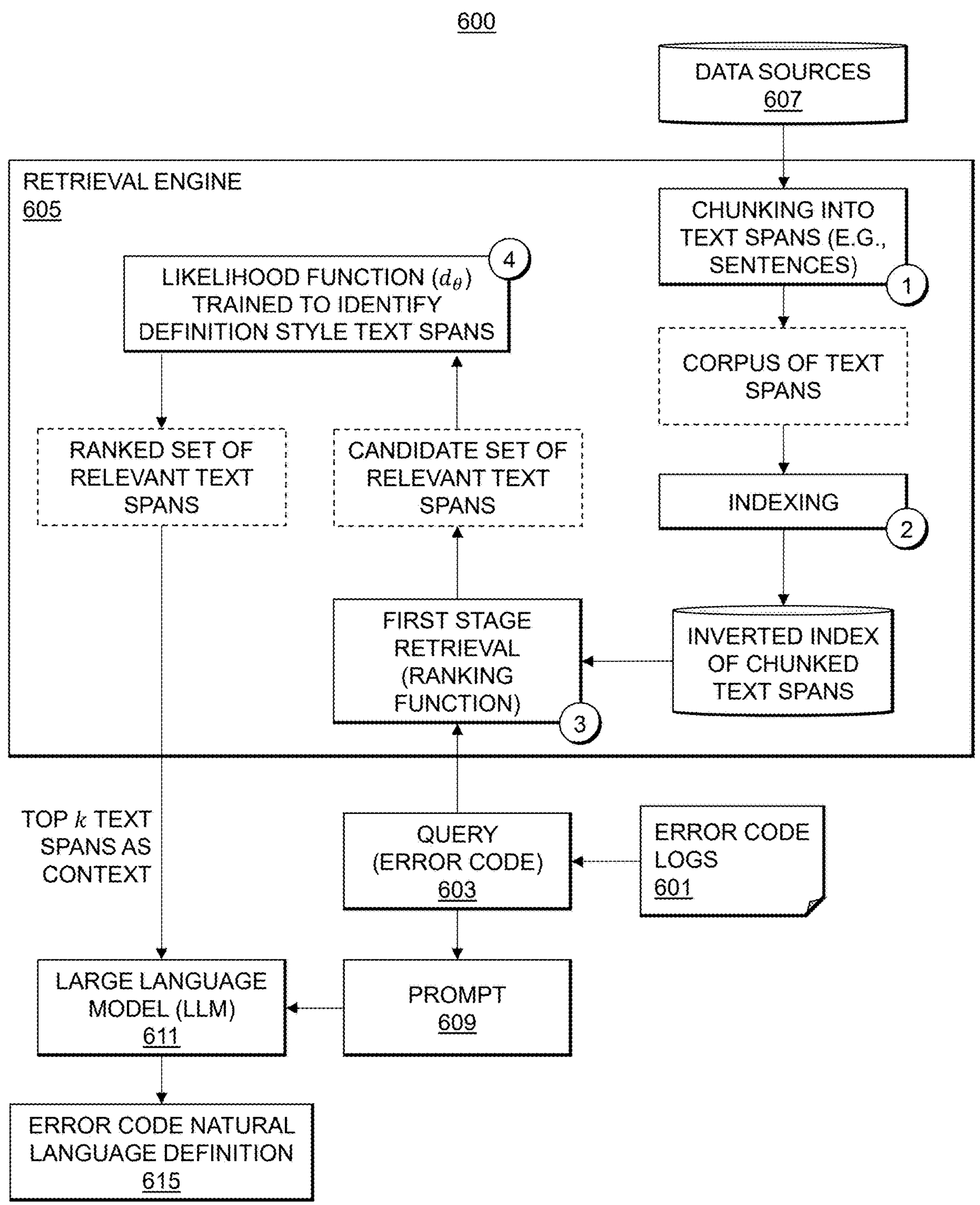
FIG. 6 shows another system flow for implementing a retrieval engine configured for determining natural language descriptions of error codes in an illustrative embodiment.

FIG. 6 shows a system flow 600 illustrating details of processing performed utilizing a retrieval engine 605. The retrieval engine 605 is configured to extract spans of text describing the meaning of an error code that is part of a query 603. The error code may be part of one or more error code logs 601 that a user is analyzing to perform troubleshooting and remediation of one or more issues encountered on one or more IT assets of an IT infrastructure. The spans of text are extracted from data sources 607, which may be a significantly large collection of documents or other data structures (e.g., including unstructured text data) in the form of emails or other communications, KB articles, source code, support tickets, etc. It is possible to retrieve documents or smaller spans inside documents from the data sources 607 which contain a specific error code somewhere in the text using keyword matching. It is challenging, however, to identify the exact spans of text that can quality as descriptions or definitions of the error codes, which is a goal of the retrieval engine 605. This is due to various reasons, including that the error codes by themselves have no semantic meaning (e.g., CD22.18, FC38.63, CC3E.18, etc.). Therefore, semantic search methods (e.g., word2ec, Bidirectional Encoder Representations from Transformers (BERT) embeddings, etc.) cannot be used to match natural language texts with the error codes. Further, not all the text spans that explicitly include the error code, or which merely discuss the error, are suitable for use as a substitute or natural language description of the error code.

To overcome these and other technical challenges, the technical solutions described herein in some embodiments utilize a novel re-ranking scheme within the retrieval engine 605 which favors text spans that match the style of a definition statement. This results in a re-ranked list of text spans retrieved from each of the data sources 607 that: (i) explicitly or implicitly refer to the error code and (ii) are similar to the style of a definition statement. This makes such text spans highly likely to be used as natural language descriptions of the error codes and function as high-quality context information for LLM 611 to generate the error code natural language definition 615. To do so, the top ranked text spans (e.g., the top k text spans) are provided as "context" to the LLM 611 along with a prompt 609 generated based on the query 603. This re-ranking scheme is formalized as a parametric function $d_\theta(\cdot)$. FIG. 6 shows the detailed architecture of the retrieval engine 605, which is configured to implement a first stage retriever (e.g., a BM25 ranking function) and a re-ranking module that are connected sequentially. The first stage retriever produces a candidate set of text spans in response to an error code received as query 603 from an inverted index generated from various data sources 607 after chunking. The reranking module then obtains the top k text spans from the candidate set based on their likelihood of being used as a definition of the error code in the query 603. These text spans are used as high-quality context information for the LLM 611. This is shown in system flow 600 as the following steps:

1. Documents or other data structures from the data sources 607 are chunked into text spans (e.g., sentences), which produces a corpus of text spans. This chunking involves processing individual documents or other data structures from the data sources 607 (e.g., emails, KB articles, Jira or other support tickets, source code, etc.) into smaller spans of text which are treated as separate documents themselves for the subsequent indexing process. In some embodiments, this step utilizes semantic chunking as implemented using the LangChain application programming interface (API).
2. The corpus of text spans is then indexed to generate an inverted index of the chunked text spans. The text spans are stored in the inverted index with a dynamic number of buckets (e.g., a n-probe parameter) determined by the user (e.g., from a set of options, such as [32, 64, 128, 256, 512]) to facilitate advanced sparse retrieval in response to queries.
3. The first stage retrieval is then performed (e.g., using a BM25 or other suitable ranking function) which produces a candidate set of relevant text spans. The goal of this stage is to retrieve a candidate set of text spans from the inverted index in response to queries with error codes. In this stage, retrieval strategies are used that are recall-specific to ensure any text span with a mention of the error code in the query 603 is retrieved. Any sparse retrieval technique that relies on term frequency metrics can be utilized.
4. The likelihood function $d_\theta$, which is trained to identify "definition style" text spans, is then applied to the candidate set of relevant text spans to produce the ranked set of relevant text spans. As discussed above, not all text spans that merely mention the error code may be used as definitions of the error code. To emphasize the text spans that may be useful as the definitions of the error code among the candidate set, the re-ranking scoring function $d_\theta$ is used with learnable parameters θ that are trained to identify particular types of text spans (e.g., those that are likely to include definitions or descriptions of error codes). The top k documents or text spans from the re-ranked candidate set are used as the context for the LLM 611 to generate the error code natural language definition 615 based on a prompt 609 generated from the query 603. The value of k is a hyperparameter, and is typically much smaller than the size of the candidate set.

Figure 7:
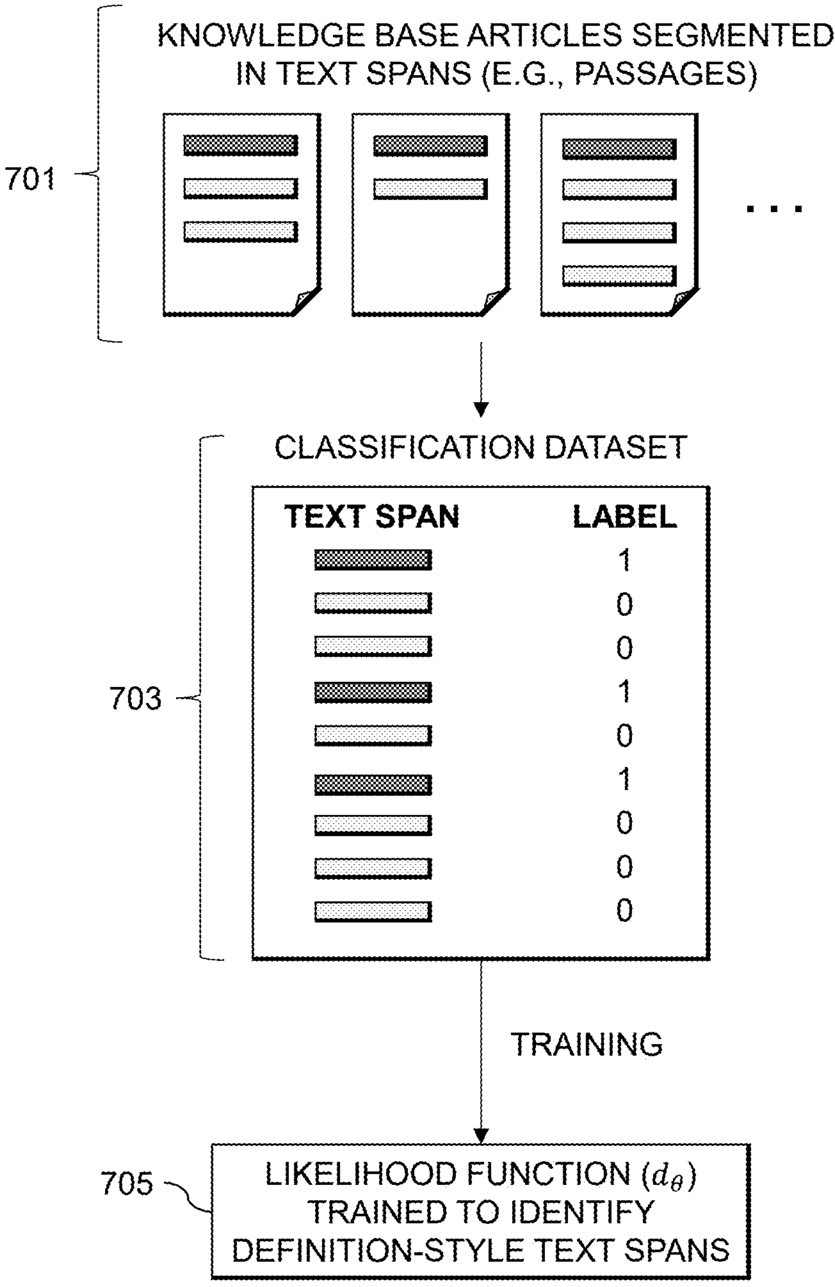
FIG. 7 shows a system flow for training a likelihood function to identify definition-style text spans in knowledge base articles in an illustrative embodiment.

In some embodiments, the re-ranking scoring function $d_\theta$ is implemented utilizing a machine learning model, such as a deep neural network architecture with natural language understanding capability (e.g., a BERT model, fine-tuned to detect suitability of text spans as definition statements). Training of the re-ranking scoring function $d_\theta$ will now be described in further detail. Let $d_\theta(\cdot)$ be a parametric function that measures the likelihood of a text span being a definition statement. Given an error code e and a corresponding retrieved candidate set of N text spans $C_e=\{t_i: i=1 \ldots N\}$, a re-ranked list of text spans is generated using a ranking score $r_i=d_\theta(t_i)$. The likelihood function $d_\theta$ may be trained using a classification task with labeled examples of definition statements. To efficiently collect a large collection of such labeled examples, some embodiments utilize web-based resources, such as Wikipedia. It is observed that for most Wikipedia articles, the primary goal of the very first passage of the article is to introduce the topic to the reader. Based on this observation, the first passages in a collection of randomly-sampled Wikipedia pages (or sections thereof) are positively labeled (e.g., as definition style text spans) to automatically generate a supervised dataset to learn $d_\theta(\cdot)$. This training process is illustrated in FIG. 7. FIG. 7 shows a system flow 700 for training a re-ranking scoring function, in which knowledge base articles segmented in text spans (e.g., passages) 701 are used to produce a classification dataset 703 (e.g., labeling each text span), which is used to train the likelihood function 705 to identify definition-style text spans.

An example of generation of natural language error code descriptions will now be described, where a set of errors with designated severity levels are selected from a time-ordered sequence of error codes in logs produced by an IT asset. It is hard to understand what the error codes mean without much context from most testers, developers or other users. FIG. 8 shows a table 800 (e.g., a mapping structure between error codes and natural language summary descriptions) for a time order of selected error codes with the designated severity levels. The table 800 also includes columns for the emulation type and latest timestamp of the error codes in the system logs produced by the IT asset. The natural language summary descriptions are advantageously easier to understand than cryptic error codes (e.g., such as those shown in FIG. 3). As the tester or other user can naturally understand these descriptions better, the tester may be able to rectify the problem on their own (e.g., a dropped fiber frame link issue in this example) first before reaching out to developers or other users with more technical expertise, thus saving significant resources (e.g., storage array or other IT asset holding time for triages and regression test cases).

The technical solutions described herein advantageously provide a novel retrieval engine providing RAG processing functionality for an LLM, where the retrieval engine has trainable parameters and is capable of the retrieval and summarization of unstructured text associated with system logs containing embedded error codes. Further, the technical solutions described herein provide a novel strategy for a dynamic re-ranking component in the RAG system used for the purpose of retrieving unstructured text associated with system error codes. As discussed above, system logs with critical error messages are often cryptic and non-actionable except for highly skilled professionals with niche knowledge of the error codes. The technical solutions described herein simplify the system logs by adding natural language definitions, making the system dynamics more transparent to support engineers and even end-users. By providing easy-to-understand error messages with natural language descriptions, the technical solutions described herein are advantageously able to streamline the root cause analysis process after system outages (or other troubleshooting and remediation of issues encountered on IT assets), reducing overall service costs.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for machine learning-based processing of log error codes will now be described in greater detail with reference to FIGS. 9 and 10. Although described in the context of system 100, these platforms may also be used to implement at least portions of other information processing systems in other embodiments.

Figure 9:
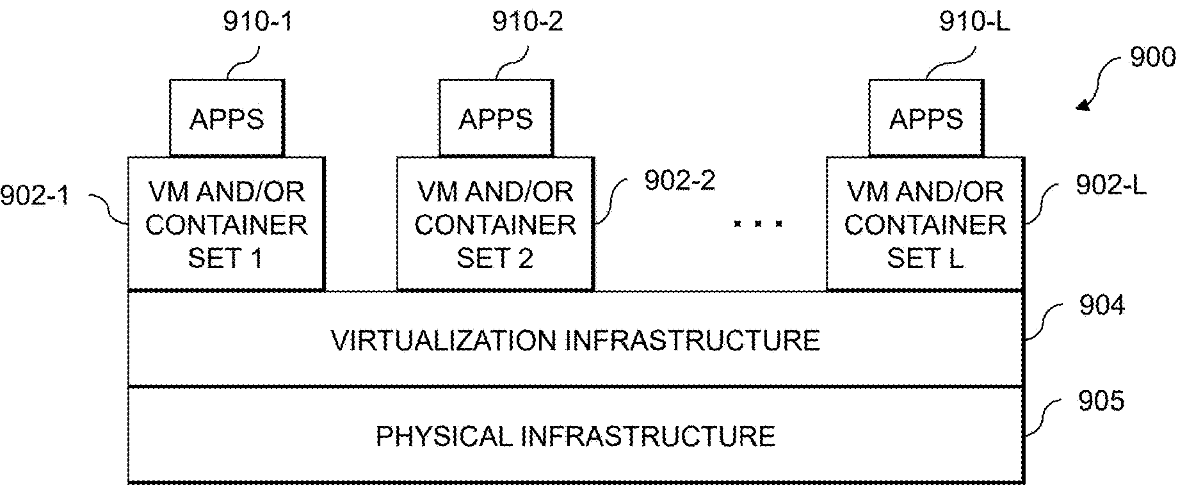
FIGS. 9 and 10 show examples of processing platforms that may be utilized to implement at least a portion of an information processing system in illustrative embodiments.
Figure 10:
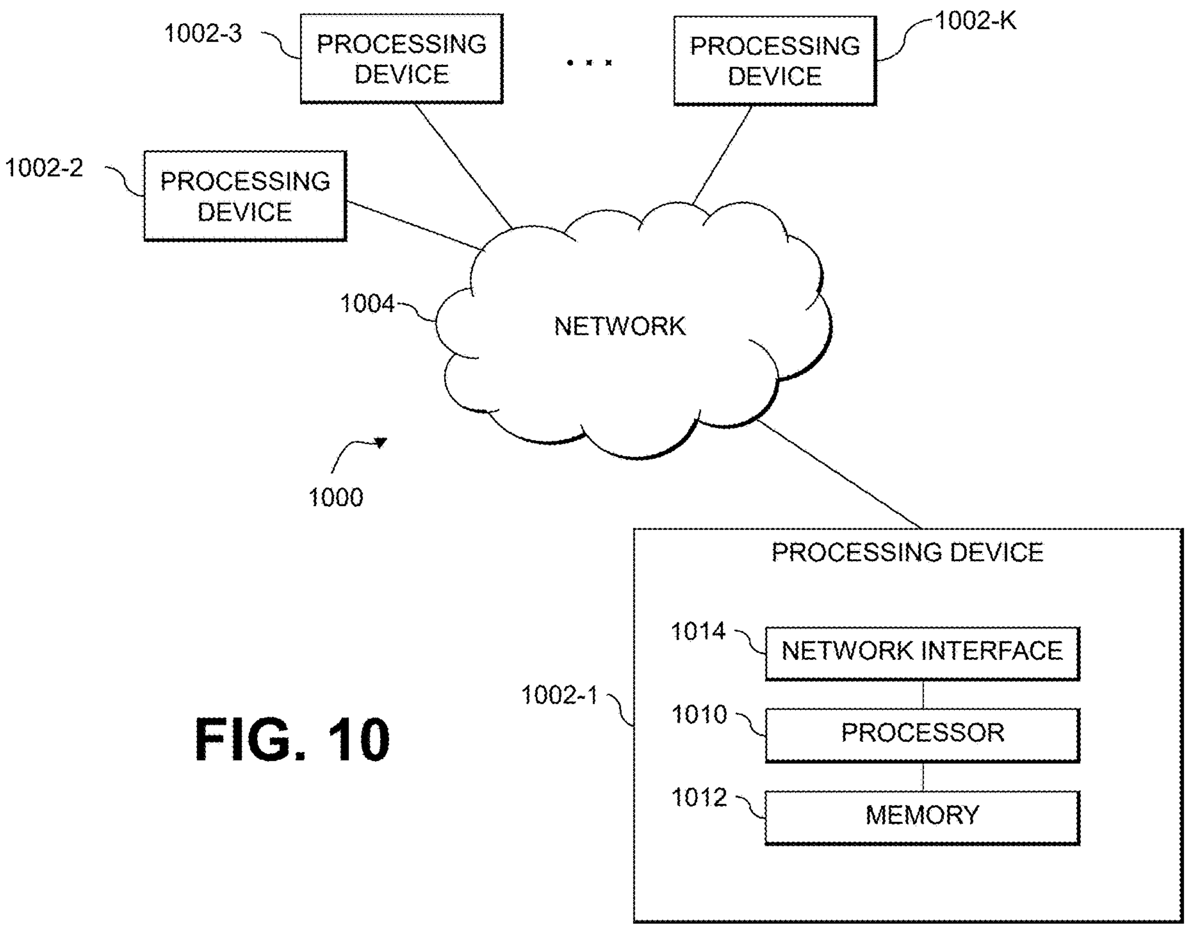

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU), a neural processing unit (NPU), a data processing unit (DPU), a System-On-Chip (SOC) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for machine learning-based processing of log error codes as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to obtain a query, the query comprising search text identifying one or more error codes in one or more system logs associated with one or more information technology assets operating in an information technology infrastructure;

to generate, utilizing at least one machine learning model, a ranking of a plurality of document chunks, wherein each document chunk in the plurality of document chunks comprises a portion of content of one or more documents containing information associated with the one or more error codes, the ranking being based at least in part on determining a likelihood of respective ones of the plurality of document chunks providing a natural language definition statement for the one or more error codes identified in the search text of the query, the at least one machine learning model having a deep neural network architecture with natural language understanding capability, the at least one machine learning model being trained utilizing labeled examples of definition-style text spans in a document corpus comprising the one or more documents;

to select, as context for the query, a subset of the plurality of document chunks based at least in part on the generated ranking of the plurality of document chunks;

to generate, based at least in part on the query, a prompt for input to a machine learning system, the prompt comprising the selected subset of the plurality of document chunks;

to apply the prompt to the machine learning system to generate an output; and to provide an answer to the query based at least in part on the output of the machine learning system, the answer comprising a natural language description of at least one of the one or more error codes.

2. The apparatus of claim 1 wherein the machine learning system comprises a large language model utilizing retrieval-augmented generation processing with the selected subset of the plurality of document chunks.

3. The apparatus of claim 1 wherein the one or more documents comprise source code of one or more applications running on the one or more information technology assets that produced the one or more system logs.

4. The apparatus of claim 1 wherein the one or more documents comprise one or more knowledge base articles containing one or more mentions of at least one of the one or more error codes.

5. The apparatus of claim 1 wherein the one or more documents comprise one or more support tickets for one or more issues encountered on the one or more information technology assets, the support tickets containing one or more mentions of at least one of the one or more error codes.

6. The apparatus of claim 1 wherein the one or more documents comprise one or more support communications associated with one or more issues encountered on the one or more information technology assets, the one or more support communications containing one or more mentions of at least one of the one or more error codes.

7. The apparatus of claim 1 wherein selecting the context for the query comprises utilizing a matching function to select ones of the plurality of document chunks as candidate document chunks that are relevant to at least one of the one or more error codes.

8. The apparatus of claim 7 wherein the matching function utilizes an inverted index of the plurality of document chunks.

9. The apparatus of claim 7 wherein selecting the context for the query further comprises utilizing a ranking function which ranks the candidate document chunks based at least in part on relevancy to at least one of the one or more error codes.

10. The apparatus of claim 9 wherein selecting the context for the query further comprises selecting a designated number of highest-ranking ones of the candidate document chunks as the subset of the plurality of document chunks.

11. The apparatus of claim 1 wherein the at least one machine learning model comprises a Bidirectional Encoder Representations from Transformers (BERT) language model.

12. The apparatus of claim 1 wherein the at least one machine learning model implements a parametric function configured to measure a likelihood of content of a document chunk providing an error code definition statement.

13. A computer program product comprising a non-transitory processor-readable storage medium having stored therein program code of one or more software programs, wherein the program code when executed by at least one processing device causes the at least one processing device:

to obtain a query, the query comprising search text identifying one or more error codes in one or more system logs associated with one or more information technology assets operating in an information technology infrastructure;

to generate, utilizing at least one machine learning model, a ranking of a plurality of document chunks, wherein each document chunk in the plurality of document chunks comprises a portion of content of one or more documents containing information associated with the one or more error codes, the ranking being based at least in part on determining a likelihood of respective ones of the plurality of document chunks providing a natural language definition statement for the one or more error codes identified in the search text of the query, the at least one machine learning model having a deep neural network architecture with natural language understanding capability, the at least one machine learning model being trained utilizing labeled examples of definition-style text spans in a document corpus comprising the one or more documents;

to select, as context for the query, a subset of the plurality of document chunks based at least in part on the generated ranking of the plurality of document chunks;

to generate, based at least in part on the query, a prompt for input to a machine learning system, the prompt comprising the selected subset of the plurality of document chunks;

to apply the prompt to the machine learning system to generate an output; and to provide an answer to the query based at least in part on the output of the machine learning system, the answer comprising a natural language description of at least one of the one or more error codes.

14. The computer program product of claim 13 wherein the machine learning system comprises a large language model utilizing retrieval-augmented generation processing with the selected subset of the plurality of document chunks.

15. The computer program product of claim 13 wherein the at least one machine learning model implements a parametric function configured to measure a likelihood of content of a document chunk providing an error code definition statement.

16. The computer program product of claim 13 wherein the at least one machine learning model comprises a Bidirectional Encoder Representations from Transformers (BERT) language model.

17. A method comprising:

obtaining a query, the query comprising search text identifying one or more error codes in one or more system logs associated with one or more information technology assets operating in an information technology infrastructure;

generating, utilizing at least one machine learning model, a ranking of a plurality of document chunks, wherein each document chunk in the plurality of document chunks comprises a portion of content of one or more documents containing information associated with the one or more error codes, the ranking being based at least in part on determining a likelihood of respective ones of the plurality of document chunks providing a natural language definition statement for the one or more error codes identified in the search text of the query, the at least one machine learning model having a deep neural network architecture with natural language understanding capability, the at least one machine learning model being trained utilizing labeled examples of definition-style text spans in a document corpus comprising the one or more documents;

selecting, as context for the query, a subset of the plurality of document chunks based at least in part on the generated ranking of the plurality of document chunks;

generating, based at least in part on the query, a prompt for input to a machine learning system, the prompt comprising the selected subset of the plurality of document chunks;

applying the prompt to the machine learning system to generate an output; and providing an answer to the query based at least in part on the output of the machine learning system, the answer comprising a natural language description of at least one of the one or more error codes;

wherein the method is performed by at least one processing device comprising a processor coupled to a memory.

18. The method of claim 17 wherein the machine learning system comprises a large language model utilizing retrieval-augmented generation processing with the selected subset of the plurality of document chunks.

19. The method of claim 17 wherein the at least one machine learning model implements a parametric function configured to measure a likelihood of content of a document chunk providing an error code definition statement.

20. The method of claim 17 wherein the at least one machine learning model comprises a Bidirectional Encoder Representations from Transformers (BERT) language model.

* * * * *